(12) United States Patent
Binu et al.

(10) Patent No.: US 11,349,373 B2
(45) Date of Patent: *May 31, 2022

(54) RADIAL COUNTER FLOW JET COOLING SYSTEM

(71) Applicant: General Electric Technology GmbH, Baden (CH)

(72) Inventors: Moonjanattu Mathew Binu, Birr (CH); Satish Srinivasan, Birr (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 573 days.

This patent is subject to a terminal disclaimer.

(21) Appl. No.: 16/398,424

(22) Filed: Apr. 30, 2019

(65) Prior Publication Data

US 2019/0260268 A1 Aug. 22, 2019

Related U.S. Application Data

(62) Division of application No. 15/298,453, filed on Oct. 20, 2016, now Pat. No. 10,326,335.

(51) Int. Cl.
| | |
|---|---|
| *H02K 9/16* | (2006.01) |
| *H02K 3/24* | (2006.01) |
| *H02K 1/32* | (2006.01) |
| *H02K 9/10* | (2006.01) |

(52) U.S. Cl.
CPC ............. *H02K 9/16* (2013.01); *H02K 3/24* (2013.01); *H02K 1/32* (2013.01); *H02K 9/10* (2013.01)

(58) Field of Classification Search
CPC .. H02K 9/10; H02K 9/12; H02K 9/14; H02K 9/16; H02K 1/32; H02K 3/24
See application file for complete search history.

(56) References Cited

U.S. PATENT DOCUMENTS

| | | | |
|---|---|---|---|
| 2,787,721 A | 4/1954 | Tudge | |
| 4,634,910 A | 1/1987 | Schollhorn | |
| 5,477,095 A * | 12/1995 | Kleinburger | H02K 3/22 310/55 |
| 7,141,898 B2 | 11/2006 | Thiot | |
| 7,190,094 B2 | 3/2007 | Mayor | |
| 7,816,825 B2 | 10/2010 | Jarczynski et al. | |

(Continued)

FOREIGN PATENT DOCUMENTS

| | | |
|---|---|---|
| EP | 1997209 A1 | 12/2008 |
| EP | 2120314 A1 | 11/2009 |

(Continued)

OTHER PUBLICATIONS

Extended European Search Report and Opinion issued in connection with EP Application No. 17197337.3, dated Mar. 26, 2018 (12 pp.).

*Primary Examiner* — Jeremy A Luks
(74) *Attorney, Agent, or Firm* — Eversheds Sutherland (US) LLP

(57) ABSTRACT

The present application provides a radial counter flow jet gas cooling system for a rotor of a dynamoelectric machine. The radial counter flow jet gas cooling system may include a centering pin, a number of axial inlet ducts, a number of radial outlet ducts in communication with the axial inlet ducts, an axial subslot positioned about the axial inlet ducts, and a radial counter flow duct in communication with the axial subslot and extending along the centering pin.

15 Claims, 6 Drawing Sheets

(56) References Cited

U.S. PATENT DOCUMENTS

| | | |
|---|---|---|
| 8,049,379 B2 | 11/2011 | Buskirk et al. |
| 10,326,335 B2 * | 6/2019 | Binu ........................ H02K 3/24 |
| 2006/0279145 A1 | 12/2006 | De Bock |
| 2010/0096937 A1 | 4/2010 | Kaminski et al. |
| 2010/0283335 A1 | 11/2010 | Salamah |
| 2012/0101768 A1 | 4/2012 | Binu |
| 2014/0232220 A1 | 8/2014 | Srinivasan |
| 2015/0162804 A1 | 6/2015 | Tolpadi |

FOREIGN PATENT DOCUMENTS

| | | |
|---|---|---|
| GB | 2 399 231 A | 9/2004 |
| JP | S50146005 U | 12/1975 |
| JP | S56-118564 U | 9/1981 |
| JP | S63-4140 U | 1/1988 |
| JP | H07-170683 A | 7/1995 |
| JP | 2015-112006 A | 6/2015 |

\* cited by examiner

RADIAL COUNTER FLOW JET COOLING SYSTEM

RELATED APPLICATIONS

The present application is a divisional of U.S. application Ser. No. 15/298,453, filed on Oct. 20, 2016, now allowed. U.S. application Ser. No. 15/298,453 is incorporated herein by reference in full.

TECHNICAL FIELD

The present application and the resultant patent relate generally to dynamoelectric machines such as generators used in the production of electrical power and more particularly relate to improved cooling of dynamoelectric machine rotors using a radial-axial jet cooling system.

BACKGROUND OF THE INVENTION

Generally described, large turbine driven generators used in the production of electrical power and the like may include a rotor and a stator. The rotor serves as a source of magnetic lines of flux produced by a coil wound thereon. The rotor rotates within the stator. The stator may include a number of conductors in which an alternating current may be induced therein. Specifically, this rotation generates a magnetic field in a narrow gas gap between the rotor and the stator.

The overall power output of a generator may be limited by the inability to provide additional current due to a buildup of heat in the stator components and/or the rotor components. This generated heat should be dissipated to a cooling gas or other medium so as to avoid insulation failure and the like. Moreover, the lack of adequate cooling may result in a rotor winding hot spot. For example, a typical rotor winding hot spot may be found about the center line of the rotor. Specifically, many rotor designs may have a non-actively cooled centering pin positioned along the centering line. Reducing hot spot temperatures about the centering pin and elsewhere thus may increase the utilization of the rotor windings and the overall power output of the generator.

SUMMARY OF THE INVENTION

The present application and the resultant patent thus provide a radial counter flow jet gas cooling system for a rotor of a dynamoelectric machine. The radial counter flow jet gas cooling system may include a centering pin, a number of axial inlet ducts, a number of radial outlet ducts in communication with the axial inlet ducts, an axial subslot positioned about the axial inlet ducts, and a radial counter flow duct in communication with the axial subslot and extending along the centering pin to provide cooling thereto.

The present application and the resultant patent further provide a method of cooling a rotor of a dynamoelectric machine. The method may include the steps of flowing cooling gas through a number of axial inlet ducts and a number of radial outlet ducts to cool a number of conductor bars, flowing cooling gas through an axial subslot and a radial counter flow duct to cool a centering pin, and flowing the cooling gas from the radial counter flow duct into the axial inlet ducts and one or more of the radial outlet ducts.

The present application and the resultant patent further provide a rotor of a dynamoelectric machine. The rotor may include a centering pin, a number of axial inlet ducts with one or more flow separators, a number of radial outlet ducts in communication with the axial inlet ducts, an axial subslot positioned about the axial inlet ducts, and a radial counter flow duct in communication with the axial subslot, extending along the centering pin, and in communication with the axial inlet ducts.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
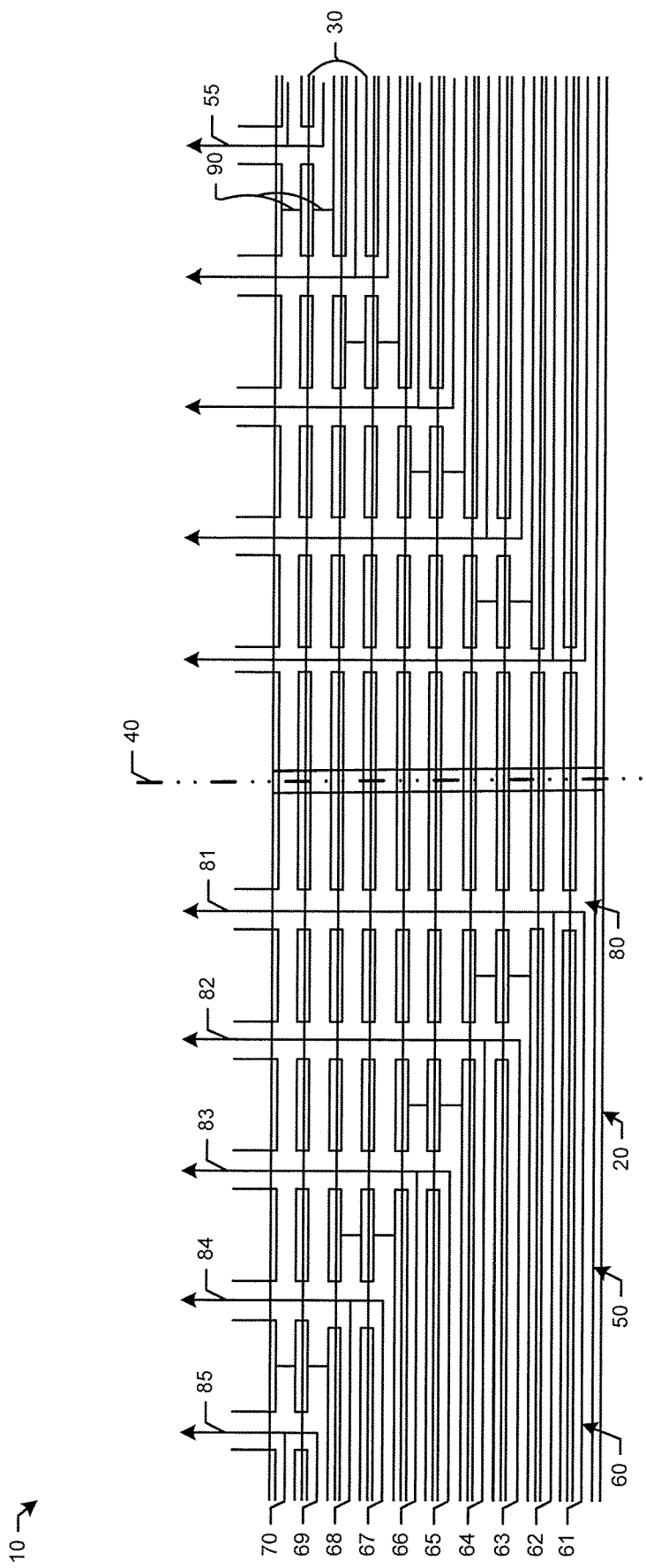
FIG. 1 is a schematic diagram of a portion of a rotor with a radial-axial cooling scheme.

Referring now to the drawings, in which like numerals refer to like elements throughout the several views, FIG. 1 is a schematic diagram of an example of a portion of a dynamoelectric machine 100. Specifically, a portion of a rotor 20 is shown. The rotor 20 may include a number of conductor bars 30 axially positioned about a centering pin 40. The rotor 20 may include an gas cooling system 50. The gas cooling system 50 may include a number of axial inlet ducts 60. In this example, ten (10) axial inlet ducts 60 are shown with a first axial inlet duct 61, a second axial inlet duct 62, a third axial inlet duct 63, . . . and a tenth axial inlet duct 70. Each pair of the axial inlet ducts 60 may lead to a radial outlet duct 80. In this example, a first radial outlet duct 81 that extends from the first axial inlet duct 61 and the second axial inlet duct 62, a second radial outlet duct 82 that extends from the third axial inlet duct 63 and the fourth axial inlet duct 64, . . . and a fifth radial outlet duct 85 that extends from the ninth axial inlet duct 69 and the tenth axial inlet duct 70. Any number of the axial inlet ducts 60 and the radial inlet ducts 80 may be used. The axial inlet ducts 60 may include one or more flow separators 90, (i.e., a blocker or a crimping) about each radial outlet duct 80 or elsewhere so as to block the flow of gas 55.

The flow of gas 55 may extend into the axial inlet ducts 60 and out via the radial outlet ducts 80 towards the air gap. As is shown, only the first axial inlet duct 61 and the second axial inlet duct 62 may extend about the centering pin 40. As a result, the remaining length of the centering pin 40 may not be actively cooled and hence may lead to a hot spot and the like. The rotor 20 described herein is for the purpose of example only. Many other and different types of rotors and rotor components may be known.

Figure 2:
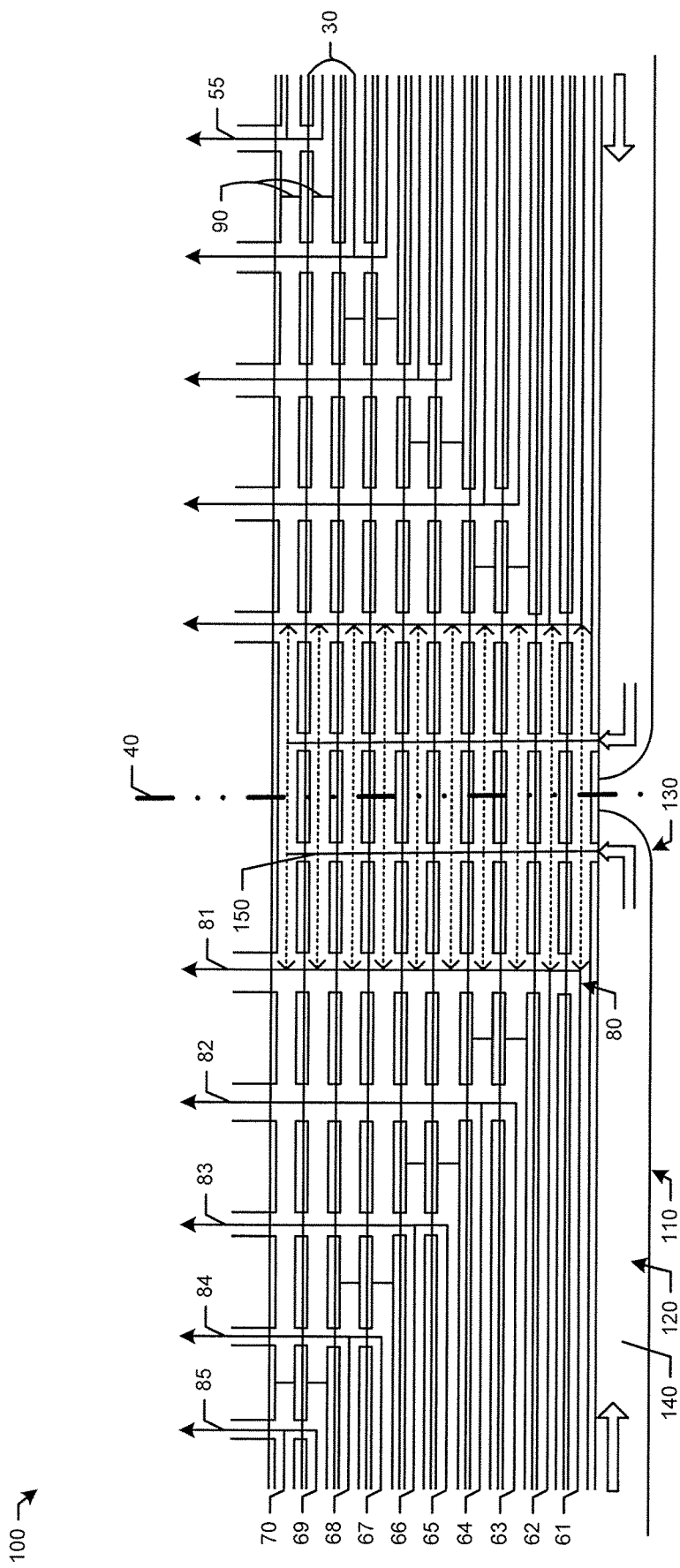
FIG. 2 is a schematic diagram of a portion of a rotor with a radial counter flow jet gas cooling system as may be described herein.

FIG. 2 is a schematic diagram of an example of a portion of a dynamoelectric machine 100 as may be described herein. Specifically, a portion of a rotor 110 is shown. The rotor 110 may include the conductor bars 30 positioned about the centering pin 40. The rotor 110 also may include a radial counter flow jet gas cooling system 120. The radial counter flow jet gas cooling system 120 may include the axial inlet ducts 60 and the radial outlet ducts 80. Any number of the axial inlet ducts 60 and the radial outlet ducts 80 may be used herein in any suitable size, shape, or configuration. In this example, the radial counter flow jet gas cooling system 120 may include a radial counter flow jet 130. The radial counter flow jet 130 may include an axial subslot 140. The axial subslot 140 may be positioned beneath the axial inlet ducts 60. The axial subslot 140 may lead to a radial counter flow duct 150. The radial counter flow duct 150 may be in communication with the axial inlet ducts 60 and the first radial outlet duct 81. The axial subslot 140 may be about half the size of the existing axial inlet ducts 60 although the axial subslot 140 and the radial counter flow duct 150 may have any suitable size, shape, or configuration. Other components and other configurations may be used herein.

In use, the radial counter flow jet gas cooling system 120 may provide the cooling gas 55 close to the centering pin 40 via the axial subslot 140 and the radial counter flow duct 150 of the radial counter flow jet 130. Specifically, the cooling gas 55 may extend through the radial counter flow duct 150 along the length of the centering pin 40 to provide cooling thereto. The cooling gas 55 then may be exhausted in a counter flow direction along the axial inlet ducts 60 and out via the first radial outlet duct 81 or otherwise. Other components and configurations also may be used herein.

Figure 3:
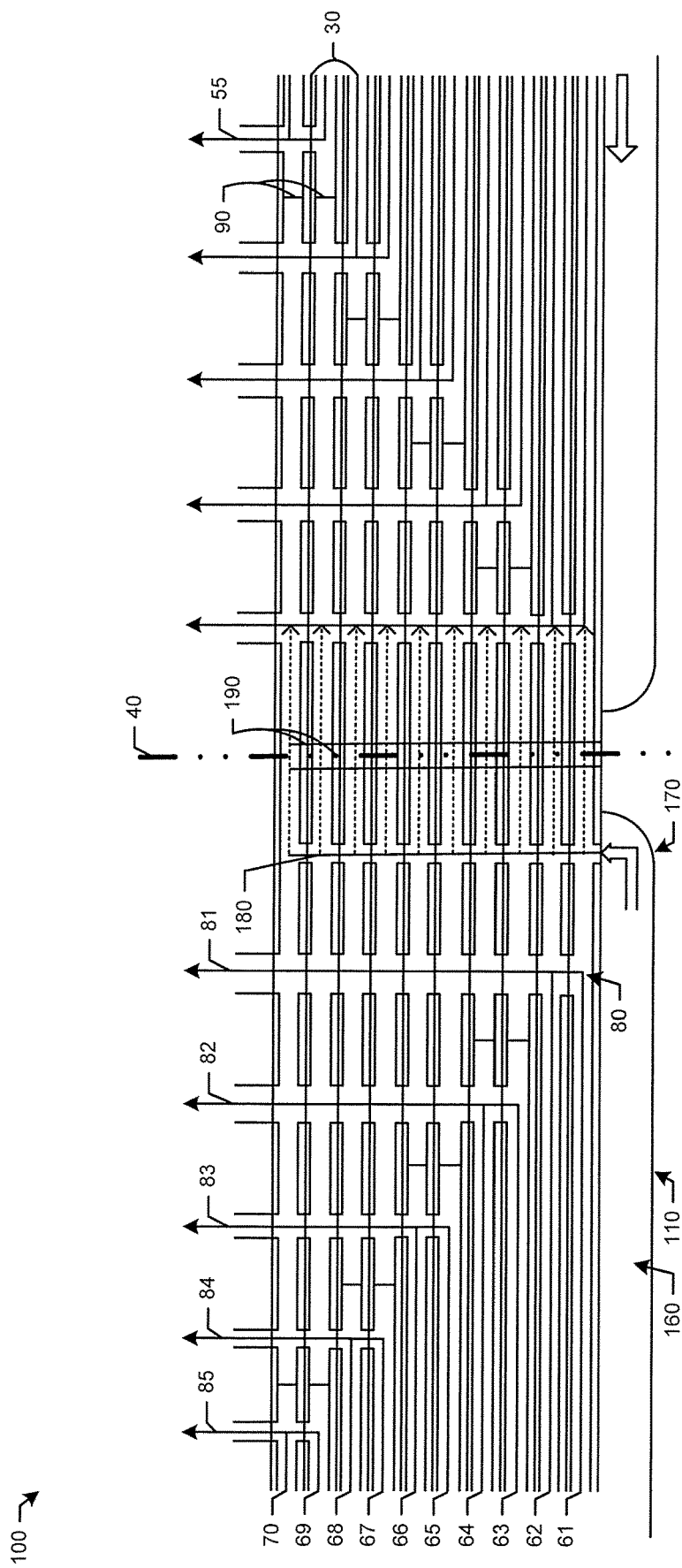
FIG. 3 is a schematic diagram of an alternative embodiment of a radial counter flow jet gas cooling system as may be described herein.

FIG. 3 shows an alternative embodiment of a radial counter flow jet gas cooling system 160. In this example, the gas cooling system 160 may include a radial cross over cooling jet 170. The radial cross over cooling jet 170 may include the axial subslot 140. The axial subslot 140 may lead to a radial cross over duct 180. The radial cross over duct 180 may be in communication with a number of cross over slots 190 positioned within the centering pin 40. The cooling gas 55 thus may pass through the axial subslot 140, into the radial cross over duct 180, and cross over the centering pin 40 via the cross over slots 190. The cooling gas 55 then may exit via the axial inlet ducts 60 and the radial outlet ducts 80 on the other side of the centering pin 40. The radial cross over duct 180 and the cross over slots 190 may have any suitable size, shape, or configuration. Other components and other configurations also may be used herein.

Figure 4:
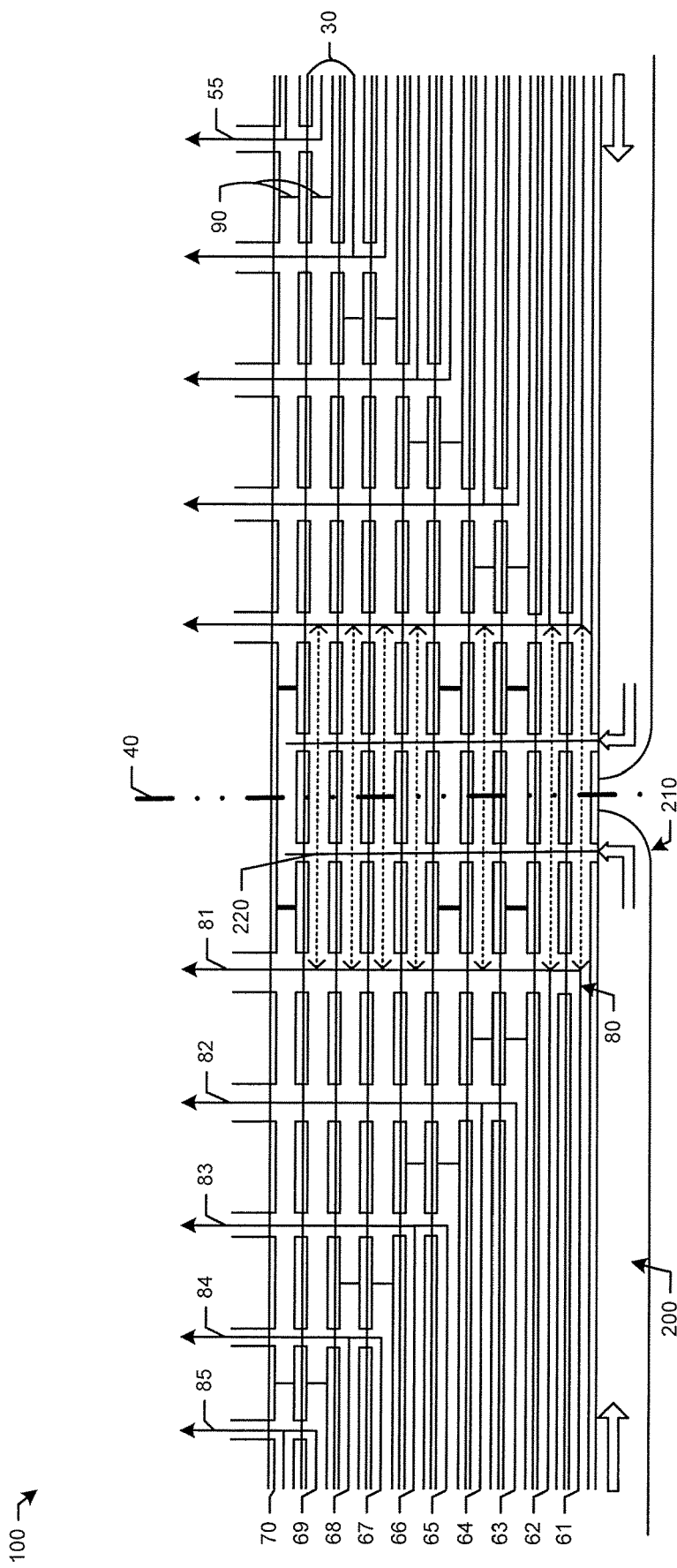
FIG. 4 is a schematic diagram of an alternative embodiment of a radial counter flow jet gas cooling system as may be described herein.

FIG. 4 shows a further alternative embodiment of a radial counter flow jet gas cooling system 200 as may be described herein. The radial counter flow jet gas cooling system 200 may include a combined radial counter flow and cross over cooling jet 210. The combination radial counter flow and cross over flow cooling jet 210 may include the axial subslot 140 leading to a radial combination duct 220. The centering pin 40 may have a number of the cross over slots 190 therein while a number of the axial inlet ducts 60 may have a flow separator 90 therein. Given such, the cooling gas 55 may enter the radial combination duct 220 with a portion of the cooling gas 55 crossing over the centering pin 40 in one direction and a portion of the cooling gas 55 extending in a cross flow direction back towards the first radial outlet duct 81 or otherwise. The radial combination duct 220 and the cross over slots 190 may have any suitable size, shape, or configuration. Other components and configurations also may be used herein.

Figure 5:
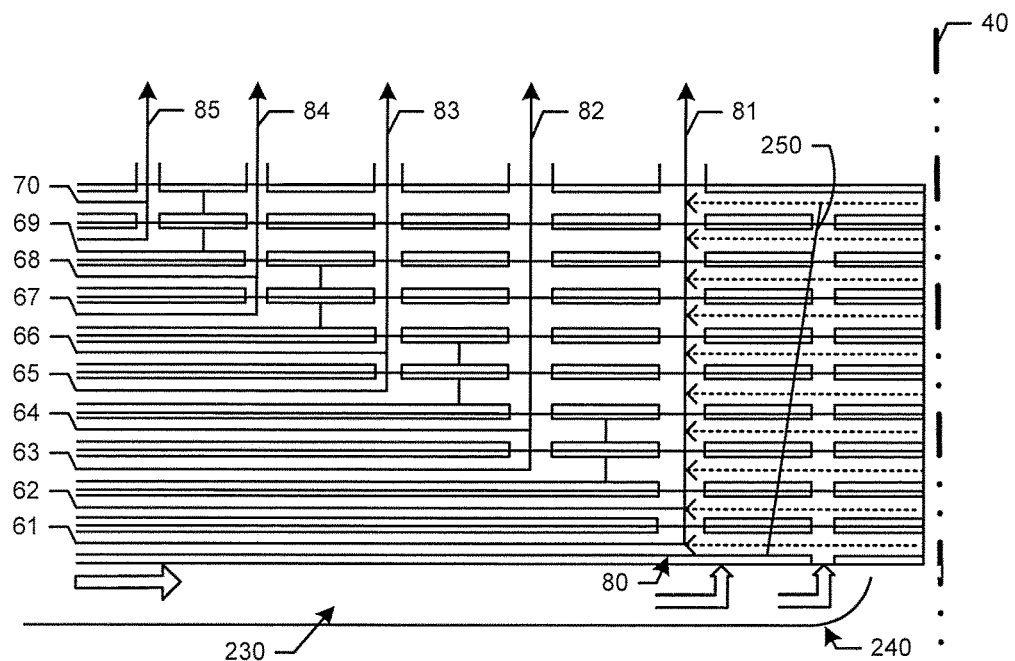
FIG. 5 is a schematic diagram of an alternative embodiment of a radial counter flow jet gas cooling system as may be described herein.
Figure 6:
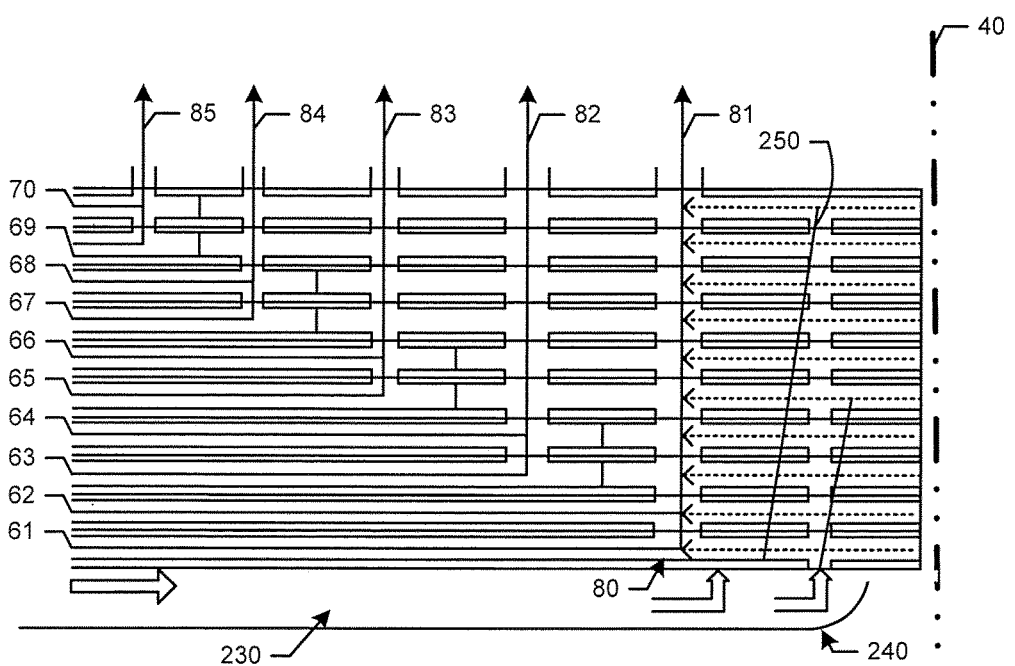
FIG. 6 is a schematic diagram of an alternative embodiment of a radial counter flow jet gas cooling system as may be described herein.

FIGS. 5 and 6 show a further embodiment of a radial counter flow jet gas cooling system 230 as may be described herein. The radial counter flow jet gas cooling system 230 may include one or more inclined radial counter flow jets 240. The inclined radial counter flow jets 240 may include the axial subslot 140. The axial subslot 140 may lead to one or more inclined radial counter flow ducts 250. The inclined radial counter flow ducts 250 may be inclined towards the centering pin 40 in the direction of the gas gap. As a result, more of the cooling gas 55 may be directed towards that end of the centering pin 40. FIG. 5 shows the use of a single inclined radial counter flow duct 250. FIG. 6 shows the use of two or more inclined radial counter flow ducts 250. Any number of the inclined radial counter flow ducts 250 may be used herein in any suitable size, shape, or configuration. Other components and other configurations may be used herein.

Figure 7:
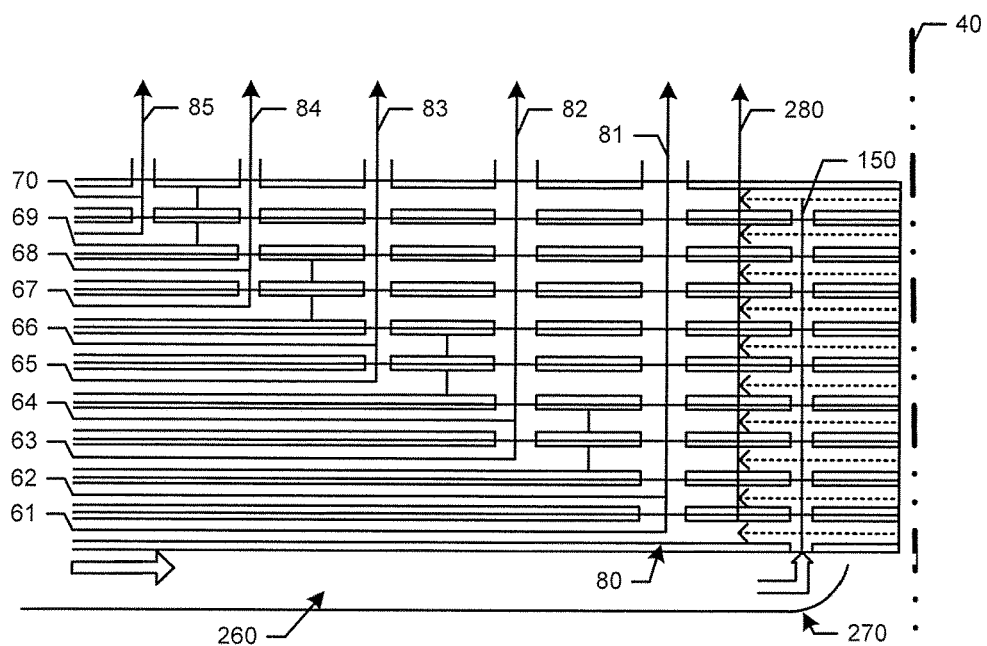
FIG. 7 is a schematic diagram of an alternative embodiment of a radial counter flow jet gas cooling system as may be described herein.

FIG. 7 shows a further embodiment of a radial counter flow jet gas cooling system 260 as may be described herein. The radial counter flow jet gas cooling system 260 may include a dedicated radial counter flow jet 270. The dedicated radial counter flow jet 270 may use the axial subslot 140 and the radial counter flow duct 150. The dedicated radial counter flow jet 270 also may include a dedicated radial outlet duct 280. The dedicated radial outlet duct 280 may provide an additional exit path for the cooling gas 55. The dedicated radial outlet duct 280 may have any suitable size, shape, or configuration. Other components and other configurations also may be used herein.

Figure 8:
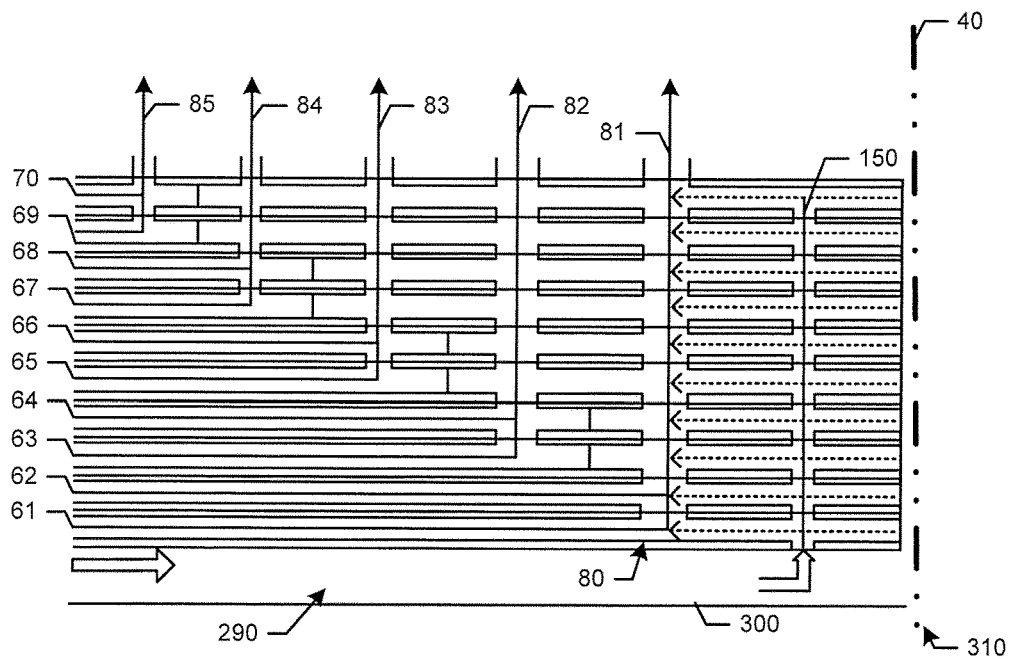
FIG. 8 is a schematic diagram of an alternative embodiment of a radial counter flow jet gas cooling system as may be described herein.

FIG. 8 shows a further embodiment of a radial counter flow jet gas cooling system 290 as may be described herein. As was shown in FIG. 2 above, the axial subslot 140 ends about the radial counter flow duct 150 on either side of the centering pin 40. In the example of FIG. 8, the radial counter flow jet gas cooling system 290 may use a continuous axial subslot 300. The continuous axial subslot 300 may extend through a centering pin subslot aperture 310. The subslot aperture 310 thus allows the cooling gas 55 to extend on either side of the centering pin 400. The continuous axial subslot 300 may have any suitable size, shape, or configuration. Other components and other configurations may be used herein.

The radial counter flow jet gas cooling systems described herein thus may significantly reduce the temperature about the centering pin 40 so as to reduce or eliminate hot spots thereabout. Such active cooling may reduce the hot spots with an optimum cooling flow thereto. Each of the radial counter flow jet gas cooling systems described above may be used as shown and/or in combination with the other embodiments.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A radial counter flow jet gas cooling system for a rotor of a dynamoelectric machine, comprising:
 a centering pin;
 the centering pin comprising a plurality of cross over slots;

a plurality of axial inlet ducts;

a plurality of radial outlet ducts in communication with the plurality of axial inlet ducts;

an axial subslot positioned about the plurality of axial inlet ducts; and a radial counter flow duct in communication with the axial subslot and extending along the centering pin.

2. The radial counter flow jet gas cooling system of claim 1, wherein the plurality of axial inlet ducts comprises one or more flow separators therein.

3. The radial counter flow jet gas cooling system of claim 1, wherein the radial counter flow duct is in communication with the plurality of axial inlet ducts.

4. The radial counter flow jet gas cooling system of claim 1, wherein the radial counter flow duct comprises a radial combination duct.

5. The radial counter flow jet gas cooling system of claim 1, wherein the radial counter flow duct comprises one or more inclined radial counter flow ducts.

6. The radial counter flow jet gas cooling system of claim 1, further comprising a dedicated radial outlet duct in communication with the radial counter flow duct.

7. The radial counter flow jet gas cooling system of claim 1, wherein the axial subslot comprises a continuous axial subslot.

8. The radial counter flow jet gas cooling system of claim 7, wherein the centering pin comprises a centering pin subslot aperture in communication with the continuous axial subslot.

9. The radial counter flow jet gas cooling system of claim 1, wherein a pair of the plurality of axial inlet ducts are in communication with one of the radial outlet ducts.

10. The radial counter flow jet gas cooling system of claim 1, wherein the plurality of axial inlet ducts and the plurality of radial outlet ducts are positioned about a plurality of conductor bars.

11. A method of cooling a rotor of a dynamoelectric machine, comprising:

flowing cooling gas through a plurality of axial inlet ducts and a plurality of radial outlet ducts to cool a plurality of conductor bars;

flowing cooling gas through an axial subslot and a radial counter flow duct to cool a centering pin; and flowing the cooling gas from the radial counter flow duct into the plurality of axial inlet ducts and one or more of the plurality of radial outlet ducts.

12. A rotor of a dynamoelectric machine, comprising:

a centering pin;

a plurality of axial inlet ducts;

one or more flow separators positioned within the plurality of axial inlet ducts;

a plurality of radial outlet ducts in communication with the plurality of axial inlet ducts;

an axial subslot positioned about the plurality of axial inlet ducts; and a radial counter flow duct in communication with the axial subslot, extending along the centering pin, and in communication with the plurality of axial inlet ducts.

13. The rotor of claim 12, wherein the radial counter flow duct comprises one or more inclined radial counter flow ducts.

14. The rotor of claim 12, further comprising a dedicated radial counter flow jet in communication with the radial counter flow duct.

15. The rotor of claim 12, wherein the axial subslot comprises a continuous axial subslot and wherein the centering pin comprises a centering pin subslot aperture in communication with the continuous axial subslot.

* * * * *